Figures 1, 2:
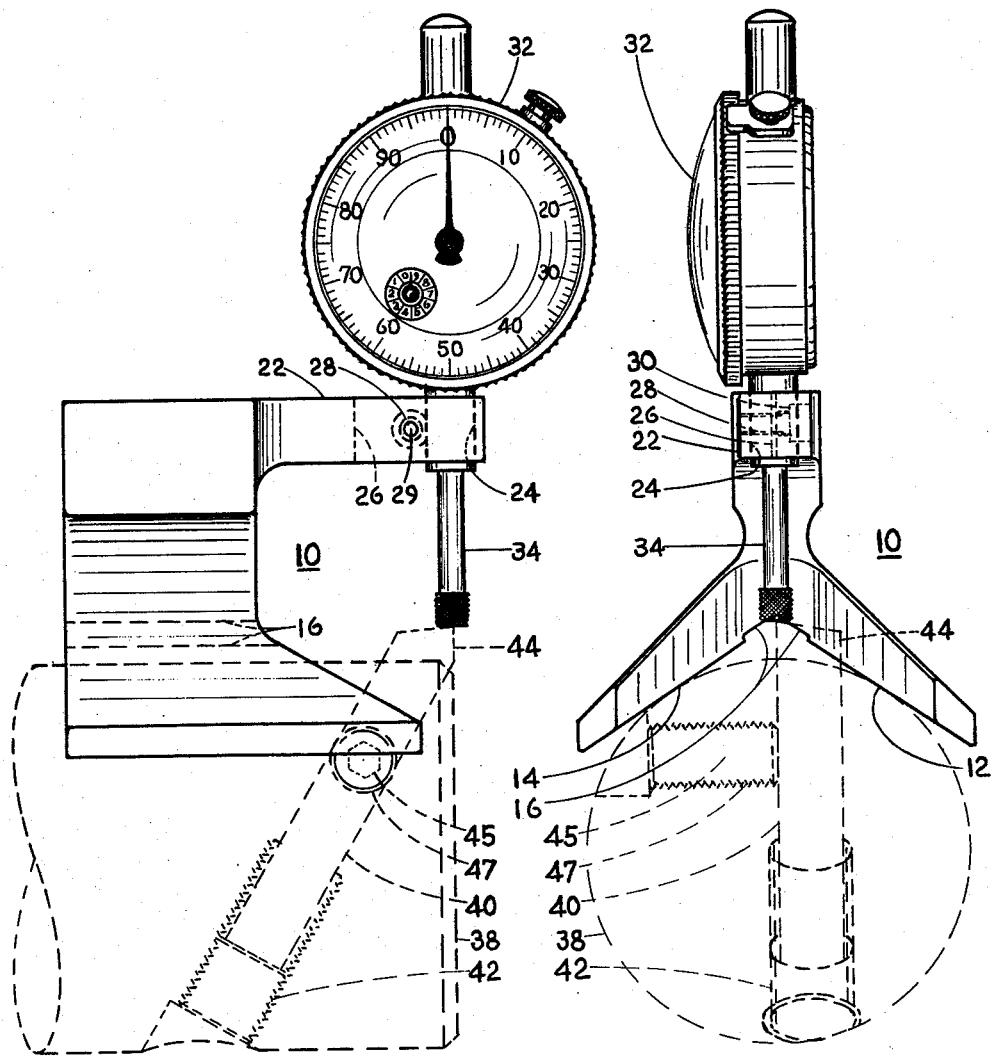

INVENTOR
THOMAS J. SLEETER
ATTORNEY

June 2, 1964  T. J. SLEETER  3,135,056
GAUGES
Filed June 1, 1959  2 Sheets-Sheet 2

INVENTOR
THOMAS J. SLEETER
ATTORNEY

United States Patent Office 3,135,056
Patented June 2, 1964

3,135,056
GAUGES
Thomas J. Sleeter, 9227 Coral Drive,
St. Louis County 23, Mo.
Filed June 1, 1959, Ser. No. 817,154
9 Claims. (Cl. 33—185)

This invention relates to improvements in gauges. More particularly, this invention relates to improvements in gauging devices that facilitate the setting of the cutting edges of cutters.

It is therefore an object of the present invention to provide an improved gauging device that facilitates the setting of the cutting edges of cutters.

In the machining of parts, it is important that the user of the machine tool be able to set the cutting edge of his cutter in a precise and accurate manner. Yet, the problem of setting the cutting edges of cutters in a precise and accurate manner can be difficult; particularly where the cutters are carried by cylindrical bars of the type used in boring operations.

One established method of gauging the setting of the cutting edge of a cutter, that is carried by a boring bar, utilizes the placing of one anvil of a micrometer in engagement with the cutting edge of the cutter and the placing of the other anvil of that micrometer in engagement with the opposite side of the boring bar. The known diameter of the boring bar is then subtracted from the resulting reading to ascertain the distance which the cutting edge of the cutter projects radially outwardly beyond the periphery of the boring bar. If that distance is precisely equal to one half of the difference between the diameter of the desired hole and the diameter of the boring bar, the cutter is properly set. If that distance is not precisely equal to one half of the difference between the diameter of the desired hole and the known diameter of the boring bar, the cutter must be shifted. After that cutter has been shifted, the micrometer must again have one of its anvils set in engagement with the cutting edge of the cutter while having its other anvil set in engagement with the opposite side of the boring bar; and the user must again calculate the distance which the cutting edge of the cutter projects radially outwardly beyond the periphery of the boring bar. If that distance still is not precisely equal to one half of the difference between the diameter of the desired hole and the known diameter of the boring bar, further gauging and further calculating will be needed to attain the required setting for the cutting edge of the cutter. That method of setting the cutting edges of the cutters, that are carried by boring bars, is objectionable because it involves so much trial and error. Further, that method is objectionable because it is difficult for a user to be sure that he always gets an anvil of the micrometer at one end of that diameter which passes through the cutting edge of the cutter, and it is also difficult for the user to be sure that he sets the micrometer in a plane that is exactly ninety degrees from the axis of the boring bar. As a result, that method is not desirable.

A second method of gauging the setting of the cutting edge of a cutter, that is carried by a boring bar, relies upon the incorporation within that boring bar of a precisely-made micrometer adjustment unit; but that micrometer adjustment unit is usuable only with that particular boring bar. The boring bars used in that second method of gauging are very expensive, and they are limited as to movement and as to application; and the scales of those micrometer adjustment units merely provide an indication of how far the cutters have been moved from an initial position, and they do not determine the desired initial position. Further, the scales of the micrometer adjustment units in the boring bars of the second method of gauging cannot reestablish the initial position of the cutting edge of the cutter after the cutter has been removed for sharpening and then re-inserted in the boring bar. To establish the desired initial position of the cutting edge of the cutter, or to re-establish that initial position after the cutter has been removed for sharpening, a micrometer must have one anvil thereof set in engagement with the cutting edge of the cutter while having the other anvil thereof set in engagement with the opposite side of the boring bar; and thereafter the user must calculate how far the cutter must be moved to set its cutting edge at the desired radial distance from the periphery of the boring bar. Once that distance has been calculated, the user can then use the micrometer adjustment unit in the boring bar to attain the desired setting of the cutting edge of the cutter. The high cost of the boring bars used in that second method of gauging, the limited movement and the limited application of the micrometer adjustment units, and the problem of precisely setting one of the anvils of the micrometer at one end of the diameter that passes through the cutting edge of the cutter plus the problem of setting the micrometer in a plane that is exactly ninety degrees from the axis of the boring bar, make that second method of gauging undesirable.

A third method of gauging the setting of the cutting edge of a cutter, that is carried by a boring bar, utilizes a dial indicator mounted on a stand post, and that stand post is mounted on a V-shaped base. That V-shaped base serves to hold the stand post at right angles to the axis of the boring bar, and the stand post makes it possible to set the indicator at different positions radially of the geometric center of the boring bar. A master gauge block or a stack of standard gauge blocks, equaling the distance which the cutting edge of the cutter should project outwardly beyond the periphery of the boring bar, is then held in engagement with the periphery of the boring bar, and the plunger of the indicator is then rested against that master gauge block or the outermost block of the stack of standard gauge blocks. At such time the indicator is adjusted so its pointer is at the zero point on the dial. The master gauge block or the stack of standard gauge blocks is then removed and the indicator is placed in register with the cutting edge of the cutter. Thereafter, the cutter is advanced until the pointer of the indicator is once again at the zero point on the dial. This third method is more accurate than the first two methods, but it is too involved for general use. Instead, this third method is usually limited to applications where a large number of identical parts are to be machined.

For these various reasons, prior methods of gauging the settings of the cutting edges of cutters, that are carried by boring bars, are objectionable. The present invention obviates these objections by providing a gauging device that precisely, directly and definitely determines the radial distance from the center of the boring bar to the cutting edge of the cutter. Instead of merely indicating relative radial movement of the cutting edge of the cutter from one position to another, the gauging device provided by the present invention directly indicates the radial position of the cutting edge of the cutter relative to the axis of the boring bar; and it can thereby easily indicate to the user when he has set that cutting edge at the desired radial distance. It is therefore an object of the present invention to provide a gauging device that precisely, directly and definitely indicates the radial distance between the axis of the boring bar and the cutting edge of the cutter.

The gauging device of the present invention includes a support with a V-shaped recess in the bottom thereof, and the surfaces of that recess can be set in tangential engagement with the periphery of the boring bar. Not only will those surfaces of that recess enable that support to seat solidly on the boring bar, but they will subtend an angle which will always have its apex spaced from the periphery of the boring bar a distance substantially equal to one tenth of the diameter of that boring bar; and this will be the case irrespective of the diameter of the boring bar. That gauging device can, because of that angle, be used in a simple and direct manner to effect the precise setting of the cutting edge of the cutter. It is therefore an object of the present invention to provide a gauging device which includes a support with a V-shaped recess in the bottom thereof, and wherein the surfaces of that recess subtend an angle which will always have its apex spaced from the periphery of the boring bar a distance substantially equal to one tenth of the diameter of that boring bar.

The precise angle subtended by the surfaces of the V-shaped recess in the bottom of the support is twice as large as an angle having a sine equal to unity divided by one and two tenths. As best the subtended angle can be calculated, it is one hundred and twelve degrees, fifty three minutes and seven and four tenths seconds. When the surfaces of that recess are set in engagement with the periphery of the boring bar, those surfaces will be tangent to the periphery of that bar and the apex of the angle of that recess will be spaced beyond the periphery of that boring bar a distance substantially equal to one tenth of the diameter of that boring bar. That tangential relationship and that one tenth diameter relationship will be unaffected by the diameter of the boring bar; and, consequently, the gauging device provided by the present invention can be used with boring bars of different sizes without any need of compensating re-adjustments. For example, it is possible to use one size of gauging device provided by the present invention to gauge the setting of the cutting edges of cutters carried by boring bars of from one to five inches in diameter, and the cutters carried by those bars are usable to bore holes of from one and two hundredths of an inch to eight inches in diameter. It is therefore an object of the present invention to provide a gauging device that includes a support with a V-shaped recess in the bottom thereof which has the surfaces thereof defining a subtended angle of substantially one hundred and twelve degrees, fifty three minutes and seven and four tenths seconds.

The gauging device provided by the present invention has a direct-reading, dial-type indicator; and the contact point of the plunger of that indicator will be set so it is alined with the apex of the angle defined by the surfaces of the V-shaped recess in the bottom of the support of the gauging device whenever the pointer of the indicator is at the initial zero reference point on that dial. That indicator is at the initial zero reference point on that dial. That indicator will respond to displacement of its plunger to indicate, to the nearest one thousandth or one ten thousandth of an inch, the radial distance between the lower end of that plunger and the apex of the angle defined by the surfaces of the V-shaped recess. It is therefore an object of the present invention to provide a gauging device, for the cutting edges of cutters carried by boring bars, that has a direct-reading, dial-type indicator with the contact point of the plunger located alined with the apex of the angle subtended by the surfaces of the V-shaped recess in the bottom of the support of that gauging device whenever the pointer of that indicator is at the initial zero reference point on the dial of that indicator.

The users of the gauging device provided by the present invention can be supplied with a table giving the radial distances between the apex of the angle of the recess in the base of the support and the peripheries of the boring bars of different diameters with which that support will be used, or those radial distances can be stamped in the peripheries of those boring bars. In either event, the user merely subtracts that radial distance from the radius of the desired hole to obtain the required reading on the dial of the indicator. As a result, the user of the indicator provided by the present invention need only set the plunger of the indicator in register with the cutting edge of the cutter and then adjust the radial position of that cutter until the desired reading appears on the dial of the indicator. If the user loses the table and if the radial distance is not stamped in the periphery of the boring bar, the user need only subtract the known diameter of the boring bar from the diameter of the desired hole, divide the remainder by two, and then subtract one tenth of the diameter of the boring bar. The resulting remainder is the distance which the cutting edge of the cutter must be set beyond the apex of the angle subtended by the surfaces of the V-shaped recess in the bottom of the support for the gauging device; and the cutter will be advanced relative to the boring bar until the direct-reading, dial-type indicator indicates that resulting remainder on its dial. The fact that the apex of the angle of the V-shaped recess in the bottom of the support of the gauging device is spaced from the periphery of the boring bar by a distance substantially equal to one tenth of the diameter of the boring bar makes it possible for the user to do his calculations by means of simple arithmetic, and can make it possible for the user to do his calculations without resorting to the use of pencil and paper. For example, if the boring bar has a diameter of five inches, the apex of the V-shaped recess in the bottom of the support of the gauging device will be spaced from the geometric center of that boring bar by a distance equal to the radius of that boring bar plus one tenth the diameter of that boring bar or, more specifically, three inches. This will be a figure that appears in the user's table or is stamped in the periphery of the boring bar; and if the desired hole is to have a diameter of six and one hundred and twenty thousandths of an inch, the operator merely divides the six and one hundred and twenty thousandths by two and then subtracts three inches. In this way the user quickly and easily obtains a figure of sixty thousands of an inch. Thereafter, the user will set the surfaces of the V-shaped recess of the support of the gauging device against the periphery of the boring bar and will set the contact point of the plunger in register with the cutting edge of the cutter; and thereupon he will advance that cutter until the reading on the dial of the indicator is sixty. At such time, the cutting edge of the cutter will be properly and precisely set. It is therefore an object of the present invention to provide a gauging device, for the cutting edges of cutters, which has a V-shaped recess that subtends an angle of substantially one hundred and twelve degrees, fifty three minutes and seven and four tenths seconds, and that has a direct-reading, dial-type indicator with the contact point of its plunger normally alined with the apex of said angle.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

Figure 3:
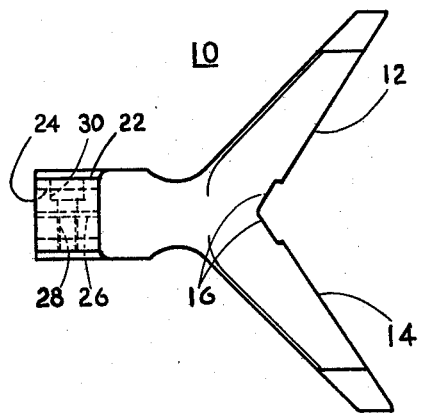
Figure 4:
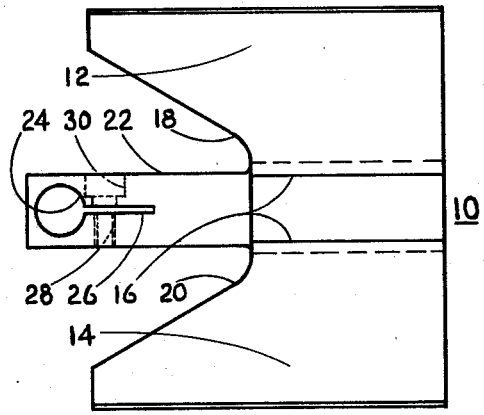
Figure 5:
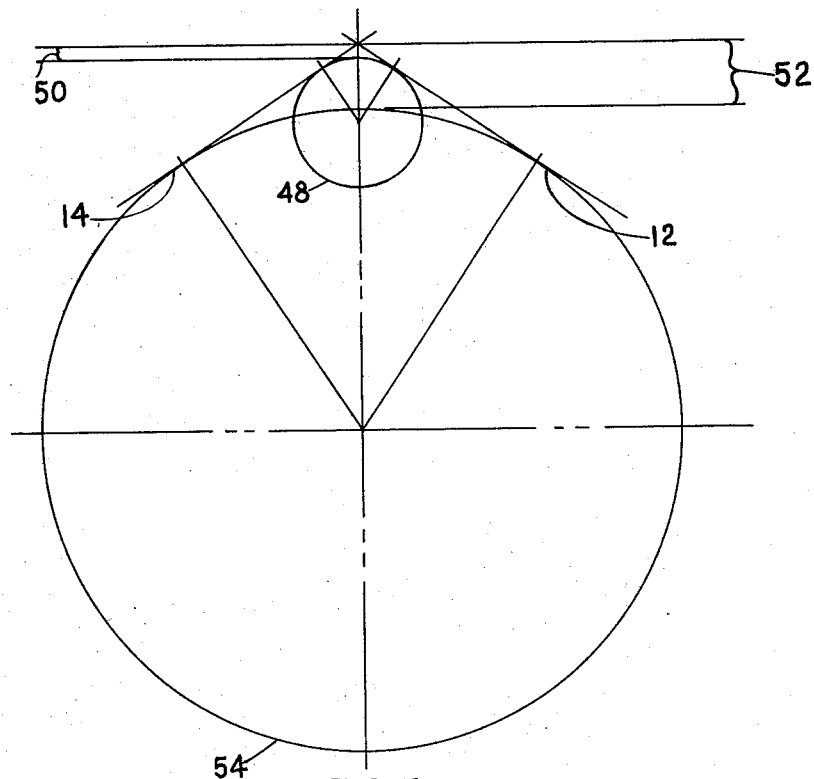

In the drawing, FIG. 1 is a side elevational view of the gauging device provided by the present invention and it shows, by dotted lines, a boring bar and cutter carried thereby as the setting of that cutter is being gauged, FIG. 2 is an end view of the gauging device and boring bar and cutter of FIG. 1, FIG. 3 is an end elevational view of the support of the gauging device of FIG. 1, FIG. 4 is a bottom view of the support of the gauging device of FIG. 1, and FIG. 5 is a diagrammatic view showing the relationship of the V-shaped recess of the support of FIGS. 3 and 4 relative to boring bars of different diameters.

Referring to the drawing in detail, the numeral 10 generally denotes a support for the gauging device that is made in accordance with the principles and teachings of the present invention. That support has two surfaces 12 and 14 which are smoothly ground to define a V-shaped recess in the bottom of that support, and those surfaces are precisely ground to subtend an angle that is twice as large as an angle having a sine equal to unity divided by one and two tenths. Unity represents the length of the radius from the geometric center of the boring bar to the point where either surface of the V-shaped recess in the bottom of the support tangentially engages the periphery of the boring bar, and the figure of one and two tenths represents the length of that radius plus two tenths of that radius or one tenth of the diameter of the boring bar. As nearly as the apex angle of the V-shaped recess in the bottom of the support 10 can be calculated, it is one hundred and twelve degrees, fifty three minutes and seven and four tenths seconds. A longitudinally-extending recess 16 is provided in the support 10 adjacent the upper ends of the surfaces 12 and 14, and that recess is provided to facilitate full and precise grinding of the entire areas of the surfaces 12 and 14.

The surfaces 12 and 14 of the support 10 are cut away, as at 18 and 20 in FIG. 4, to provide a recess at one end of the support 10. That recess is generally V-shaped in plan and it is at right angles to the V-shaped recess defined by the surfaces 12 and 14. A projection 22 extends axially of the support 10, and that projection overlies and projects beyond the V-shaped recess defined by the cut away portions of the faces 12 and 14. That projection has a vertically-directed circular opening 24 through it; and that opening can accommodate the projecting stem of a direct-reading, dial-type indicator 32. A slot 26 is provided in the projection 22, and that slot is contiguous with the opening 24. A threaded opening 28 is provided in the projection 22 intermediate the slot 26 and one side of the projection 22, and that threaded opening accommodates the shank of a set screw 29. The head of that set screw is accommodated by a shouldered opening 30 which is alined with the threaded opening 28 but which is in that portion of the projection 22 that is intermediate the slot 26 and the other side of that projection. When the set screw 29 is tightened, it will narrow the slot 26 and enable the sides of the opening 24 to fixedly grip the stem of the indicator 32.

One indicator 32 that can be used can read to thousandths of an inch, and another indicator 32 that can be used can read to one ten thousandth of an inch. Different kinds of indicators can be used, and the user can have his favorite kind of indicator assembled with the support 10. The indicator 32 has a plunger 34, and it has a large pointer and a small pointer; and the two pointers provide a direct reading of the displacement of the plunger 34. The plunger 34 is set so it bisects the angle defined by the surfaces 12 and 14. The stem of the indicator 32 will be set so the contact point of the plunger 34 is alined with the apex of the angle subtended by the surfaces 12 and 14; and at such time, the pointers of the indicator 32 will be at the initial zero reference point on the dial of the indicator.

A master gauge plug is used to establish the initial setting of the plunger 34, and that master gauge plug consists of a cylindrical bar which has a precisely ground one inch diameter portion and a second precisely ground portion with a diameter of one and two hundred thousandths of an inch. The periphery of that second portion projects outwardly beyond the periphery of the one inch diameter portion of the master gauge plug by one hundred thousandths of an inch; and that distance is exactly equal to one tenth of the diameter of the one inch diameter portion. Consequently, when the position of the stem of the indicator 32 is adjusted so the contact point of the plunger 34 engages the larger diameter portion of the master gauge plug while the surfaces 12 and 14 engage the one inch diameter portion of that master gauge plug, the contact point of the plunger 34 will be alined with the apex of the angle subtended by the surfaces 12 and 14; and the dial of the indicator 32 will be set so the pointers are at the initial zero reference point on that dial. Whenever the user of the gauging device wishes to check the setting of the indicator, he need only place the surfaces 12 and 14 in engagement with the one inch diameter portion of the master gauge plug and set the contact point of the plunger in engagement with the larger diameter portion of the master gauge plug and then see whether the pointers are at the initial zero reference point on the dial. If not, the dial of the indicator 32 will be adjusted until the pointers are at that initial zero reference point.

The numeral 38 denotes a boring bar of standard design, and that boring bar has a cutter-receiving passage 40 in it. The lower end of the passage 40 is threaded, and a threaded adjusting screw 42 is mounted in that threaded lower end. A cutter 44 is disposed in the passage 40, and rotation of the adjusting screw 42 will advance the cutting edge of that cutter. An Allen wrench can be used to rotate the adjusting screw 42 and thereby advance the cutter 44. A locking screw 45 is adjustably mounted in a threaded recess 47 in the boring bar 38, and that screw will lock the cutter 44 in position once the desired setting of the cutting edge of that cutter has been established.

In using the gauging device provided by the present invention, the user need only check his table or read off from the periphery of his boring bar the radial distance between the apex of the V-shaped recess in the bottom of support 10 and the geometric center of the boring bar and then subtract that radial distance from the radius of the desired hole. The resulting remainder is the value that will appear on the dial of the indicator 32 when the contact point of the plunger 34 engages the properly set cutting edge of the cutter 44. If the user loses his table and if the boring bar merely indicates its diameter, the user can subtract that diameter from the diameter of the desired hole, divide the remainder by two, and then subtract algebraically one tenth of the diameter of the boring bar 38. Each of these various calculations is simple and can be performed without the use of pencil and paper.

In making use of the resulting remainder, however obtained, the user places the surfaces 12 and 14 in engagement with the periphery of the boring bar 38 and sets the plunger 34 in register with the cutting edge of the cutter 44. While holding the gauging device on the boring bar 38 with one hand, the user can use an Allen wrench with his other hand to rotate the adjusting screw 42. That adjusting screw will be rotated until the cutting edge of the cutter 44 engages the contact point of the plunger 34 and moves that plunger far enough to enable the pointers of the indicator 32 to indicate the resulting remainder. When the cutting edge of the cutter 44 wears and is sharpened and again set in the recess 40 of bar 38, the gauging device will again be set on the boring bar 38 and the adjusting screw 42 will again be rotated to cause the cutting edge of the cutter 44 to move the plunger 34 and again indicate the resulting remainder on the indicator 32.

The recess defined by the cut-away portions of the surfaces 12 and 14 avoids any interference between the support 10 and the cutter 44, even where the cutting edge of that cutter projects a considerable distance beyond the periphery of the boring bar 38. Without that recess, the support 10 might too closely approach the cutter 44, because of the inclination of that cutter relative to the axis of the boring bar 38.

The angle of one hundred and twelve degrees, fifty three minutes and seven and four tenths seconds subtended by the surfaces 12 and 14 enables the apex of that angle to be spaced beyond the periphery of the boring bar 38 a distance equal to one tenth of the diameter of that boring bar, regardless of the diameter of that boring bar. For example, when the surfaces 12 and 14 of the support 10 are set on the one inch diameter boring bar indicated by the numeral 48 in FIG. 5, the distance 50 will be one hundred thousandths of an inch; and that distance is one tenth of the diameter of the boring bar 48. When the surfaces 12 and 14 of the support 10 are set on the five inch boring bar indicated by the numeral 54 in FIG. 5, the distance 52 will be five hundred thousandths of an inch; and that distance is one tenth of the diameter of the boring bar 54.

The cutting edge of a cutter carried by a boring bar will almost always project outwardly beyond the periphery of that boring bar a distance greater than one tenth of the diameter of that boring bar. Consequently, the use of the one hundred and twelve degree, fifty three minute and seven and four tenth seconds angle avoids any need of plus and minus settings on the indicator.

The use of the gauging device provided by the present invention can be made extremely simple by selecting boring bars with diameters that make the radial distances between the geometric centers of those boring bars and the apex of the V-shaped recess in the bottom of the support 10 even decimals. For example, where the boring bar diameter is one inch, that radial distance will be six hundred thousandths of an inch. Where the boring bar diameter is one and one third inches, that radial distance will be eight hundred thousandths of an inch. Where the boring bar diameter is one and two thirds of an inch, that radial distance will be one inch. Where the boring bar diameter is two and one third inches, the radial distance will be one and four hundred thousandths inches. Where the boring bar diameter is three inches, that radial distance will be one and eight hundred thousandths inches. Where the boring bar diameter is four inches, that radial distance is two and four hundred thousandths inches; and where the boring bar diameter is five inches, that radial distance will be three inches. These boring bar diameters and these radial distances are not the only ones that can be used; and, instead, they are merely illustrative. Such diameters and such radial distances make it extremely easy for the user to do his calculations without any need of pencil and paper. For example, if he wants to bore a hole having a diameter of eight inches, he will select a boring bar with a five inch diameter and merely subtract the radial distance of three inches from the desired four inch radius to obtain a resulting remainder of one inch. He will then adjust the position of the cutter until the indicator shows a one inch setting on its dial.

Whereas the drawing and accompanying description have shown and described a preferred embodiment of the present invention it should be apparent to those skilled in the art that various changes may be made in the form of the invention without affecting the scope thereof.

What I claim is:

1. A gauge that can be used to indicate the radial distance between the cutting edge of a cutter carried by a boring bar and the geometric axis of that boring bar and that can thus eliminate "cut and try" boring and that comprises a support having two surfaces thereon that are simultaneously engageable with circumferentially-spaced portions of the periphery of said boring bar, said surfaces being inclined relative to each other to define a V-shaped recess in the base of said support, said surfaces coacting to subtend an obtuse dihedral angle, said surfaces being cut away to define a second recess at right angles to said V-shaped recess, said support having a projection that overlies said second recess, and an indicator carried by said projection of said support, said surfaces being positioned so the sine of one half of said dihedral angle is substantially equal to unity divided by one and two tenths whereby the apex of said dihedral angle is spaced beyond said periphery of said boring bar a distance that is substantially equal to one tenth of the diameter of said boring bar whenever said surfaces are simultaneously placed in engagement with said circumferentially-spaced portions of said periphery of said boring bar, said diameter of said boring bar being such that the distance between the geometric center of said boring bar and said apex of said dihedral angle is an even decimal when said surfaces simultaneously engage said circumferentially-spaced portions of said periphery of said boring bar, said indicator having a pointer and a dial and having a plunger that is movable relative to the apex of said dihedral angle, said plunger being mounted to bisect said dihedral angle, the contact point of said plunger of said indicator being disposable in engagement with the cutting edge of said cutter, said contact point of said plunger of said indicator being alined with said apex of said dihedral angle when said pointer of said indicator is at the initial zero reference point of said dial, said plunger thereafter being movable outwardly by outward movement of said cutting edge of said cutter to move said pointer relative to said dial to indicate how far said cutting edge of said cutter is disposed radially outwardly beyond said apex of said dihedral angle.

2. A gauge that can be used to indicate the radial distance between the cutting edge of a cutter carried by a boring bar and the geometric axis of that boring bar and that can thus eliminate "cut and try" boring and that comprises a support having two surfaces thereon that are simultaneously engageable with circumferentially-spaced portions of the periphery of said boring bar, said surfaces being inclined relative to each other to define a V-shaped recess in the base of said support, said surfaces coacting to subtend an obtuse dihedral angle, and an indicator carried by said support, said surfaces being positioned so the sine of one half of said dihedral angle is substantially equal to unity divided by one and two tenths whereby the apex of said dihedral angle is spaced beyond said periphery of said boring bar a distance that is substantially equal to one tenth of the diameter of said boring bar whenever said surfaces are simultaneously placed in engagement with said circumferentially-spaced portions of said periphery of said boring bar, said indicator having a pointer and a dial and having a plunger that is movable relative to the apex of said dihedral angle, said plunger being mounted to bisect said dihedral angle, the contact point of said plunger of said indicator being disposable in engagement with the cutting edge of said cutter, said contact point of said plunger of said indicator being alined with said apex of said dihedral angle when said pointer of said indicator is at the initial zero reference point of said dial, said plunger thereafter being movable outwardly by outward movement of said cutting edge of said cutter to move said pointer relative to said dial to indicate how far said cutting edge of said cutter is disposed radially outwardly beyond said apex of said dihedral angle.

3. A gauge that can be used to indicate the radial distance between the cutting edge of a cutter carried by a boring bar and the geometric axis of that boring bar and that can thus eliminate "cut and try" boring and that comprises a support having two surfaces thereon that are engageable with the periphery of said boring bar, said surfaces being inclined relative to each other to define a V-shaped recess in the base of said support, said surfaces coacting to subtend an obtuse dihedral angle, and an indicator carried by said support, said surfaces being positioned so the sine of one half of said dihedral angle is substantially equal to unity divided by one and two tenths whereby the apex of said dihedral angle is spaced beyond said periphery of said boring bar a distance that is substantially equal to one tenth of the diameter of said boring bar whenever said surfaces are placed in engagement with said periphery of said boring bar, said indicator having a pointer and a dial and having a plunger that is movable relative to the apex of said dihedral angle, the contact point of said plunger of said indicator being disposable in engagement with the cutting edge of said cutter, said contact point of said plunger of said indicator being alined with said apex of said dihedral angle when said pointer of said indicator is at the initial zero reference point of said dial, said plunger thereafter being movable outwardly by outward movement of said cutting edge of said cutter to move said pointer relative to said dial to indicate how far said cutting edge of said cutter is disposed radially outwardly beyond said apex of said dihedral angle.

4. A gauge that can be used to indicate the radial distance between the cutting edge of a cutter carried by a boring bar and the geometric axis of that boring bar and that can thus eliminate "cut and try" boring and that comprises a support having two surfaces thereon that are engageable with the periphery of said boring bar, said surfaces being inclined relative to each other to define a V-shaped recess in the base of said support, said surfaces coacting to subtend an obtuse dihedral angle, and an indicator carried by said support, said surfaces being positioned so said dihedral angle is substantially one hundred and twelve degrees, fifty three minutes and seven and four tenths seconds whereby the apex of said dihedral angle is spaced beyond said periphery of said boring bar a distance that is substantially equal to one tenth of the diameter of said boring bar whenever said surfaces are placed in engagement with said periphery of said boring bar, said indicator having a pointer and a dial and having a plunger that is movable relative to the apex of said dihedral angle, the contact point of said plunger of said indicator being disposable in engagement with the cutting edge of said cutter, said contact point of said plunger being alined with said apex of said dihedral angle when said pointer of said indicator is at the initial zero reference point of said dial, said plunger being held outward by said cutting edge of said cutter to indicate how far said cutting edge of said cutter is disposed radially outwardly beyond said apex of said dihedral angle.

5. A gauge that can be used to indicate the radial distance between the cutting edge of a cutter carried by a boring bar and the geometric axis of that boring bar and that can thus eliminate "cut and try" boring and that comprises a support having two surfaces thereon that are engageable with the periphery of said boring bar, said surfaces being inclined relative to each other to subtend an obtuse dihedral angle, and an indicator carried by said support, said surfaces being positioned so the apex of said dihedral angle is spaced beyond said periphery of said boring bar a distance that is substantially equal to one tenth of the diameter of said boring bar whenever said surfaces are placed in engagement with said periphery of said boring bar, said indicator having a member that is movable relative to the apex of said dihedral angle, said member of said indicator being disposable in engagement with the cutting edge of said cutter, said member acting whenever it is alined with said apex of said dihedral angle to provide a reference that is precisely fixed and that is spaced from the periphery of said boring bar a distance exactly equal to one tenth of the diameter of said bar, said member being movable outwardly relative to said apex of said dihedral angle by the cutting edge of said cutter to enable said indicator to indicate the distance between said cutting edge of said cutter and said geometric axis of said bar, said distance consisting of the distance between said member and said apex of said dihedral angle which is directly readable upon said indicator plus the known distance between said apex of said dihedral angle and said periphery of said boring bar.

6. A gauge that can be used to indicate the radial distance between the cutting edge of a cutter carried by a boring bar and the geometric axis of that boring bar and that can thus eliminate "cut and try" boring and that comprises a support having two surfaces thereon that are engageable with the periphery of said boring bar, said surfaces being inclined relative to each other to define a V-shaped recess in the base of said support, said surfaces coacting to subtend an obtuse dihedral angle, and an indicator carried by said support, said surfaces being positioned so the apex of said dihedral angle is spaced beyond said periphery of said boring bar a distance that is substantially equal to one tenth of the diameter of said boring bar whenever said surfaces are placed in engagement with said periphery of said boring bar, said indicator having a member that is movable relative to the apex of said dihedral angle, said member of said indicator being disposable in engagement with the cutting edge of said cutter, said member of said indicator being alined with said apex of said dihedral angle when said indicator is at its initial zero reference point.

7. A gauge that can be used to indicate the radial distance between the cutting edge of a cutter carried by a boring bar and the geometric axis of that boring bar and that can thus eliminate "cut and try" boring and that comprises a support having two surfaces thereon that are engageable with the periphery of said boring bar, said surfaces coacting to subtend an obtuse dihedral angle, and an indicator carried by said support, said surfaces being positioned so the apex of said dihedral angle is spaced beyond said periphery of said bar a distance that is substantially equal to one tenth of the diameter of said boring bar whenever said surfaces are placed in engagement with said periphery of said boring bar, said indicator having a movable member that is movable relative to the apex of said dihedral angle, said movable member of said indicator being disposable in engagement with the cutting edge of said cutter.

8. A gauge that can be used to indicate the radial distance between the cutting edge of a cutter carried by a boring bar and the geometric axis of that boring bar and that can thus eliminate "cut and try" boring and that comprises a support having two surfaces thereon that are engageable with the periphery of said boring bar, said surfaces being inclined relative to each other to define a V-shaped recess in the base of said support, said surfaces coacting to subtend an obtuse dihedral angle, and an indicator carried by said support, said surfaces being positioned so the apex of said dihedral angle is spaced beyond said periphery of said boring bar a distance that is substantially equal to one tenth of the diameter of said boring bar whenever said surfaces are placed in engagement with said periphery of said boring bar, said indicator having a member that is movable relative to the apex of said dihedral angle, said member of said indicator being disposable in engagement with the cutting edge of said cutter, said member of said indicator being alined with said apex of said dihedral angle when said indicator is at its initial zero reference point, the distance between said apex of said dihedral angle and the geometric center of said boring bar being an even decimal when said surfaces engage said periphery of said boring bar.

9. The method of setting the cutting edge of a cutter carried by a boring bar that comprises establishing a point that is spaced from the periphery of said boring bar a distance substantially equal to one tenth of the diameter of said boring bar, and thereafter moving the cutting edge of said cutter outwardly beyond said point whatever distance is needed to attain the required radial setting of said cutting edge of said cutter.

References Cited in the file of this patent

UNITED STATES PATENTS

| | | |
|---|---|---|
| 2,303,007 | Thomason | Nov. 24, 1942 |
| 2,375,448 | Talbot et al. | May 8, 1945 |
| 2,872,736 | Abbott | Feb. 10, 1959 |
| 2,886,896 | Humphreville | May 19, 1959 |
| 2,891,317 | Wood | June 23, 1959 |

FOREIGN PATENTS

| | | |
|---|---|---|
| 6,556 | Great Britain | Mar. 17, 1913 |
| 455,963 | Germany | Feb. 13, 1928 |
| 474,098 | Germany | Mar. 26, 1929 |
| 591,332 | Germany | Jan. 19, 1934 |
| 487,375 | Great Britain | June 20, 1938 |
| 166,210 | Austria | June 26, 1950 |